Nov. 5, 1929.                T. J. MELL                1,734,336
        METHOD AND APPARATUS FOR ASSEMBLING UNITS OF SHEET MATERIAL
                        Filed Dec. 29, 1927
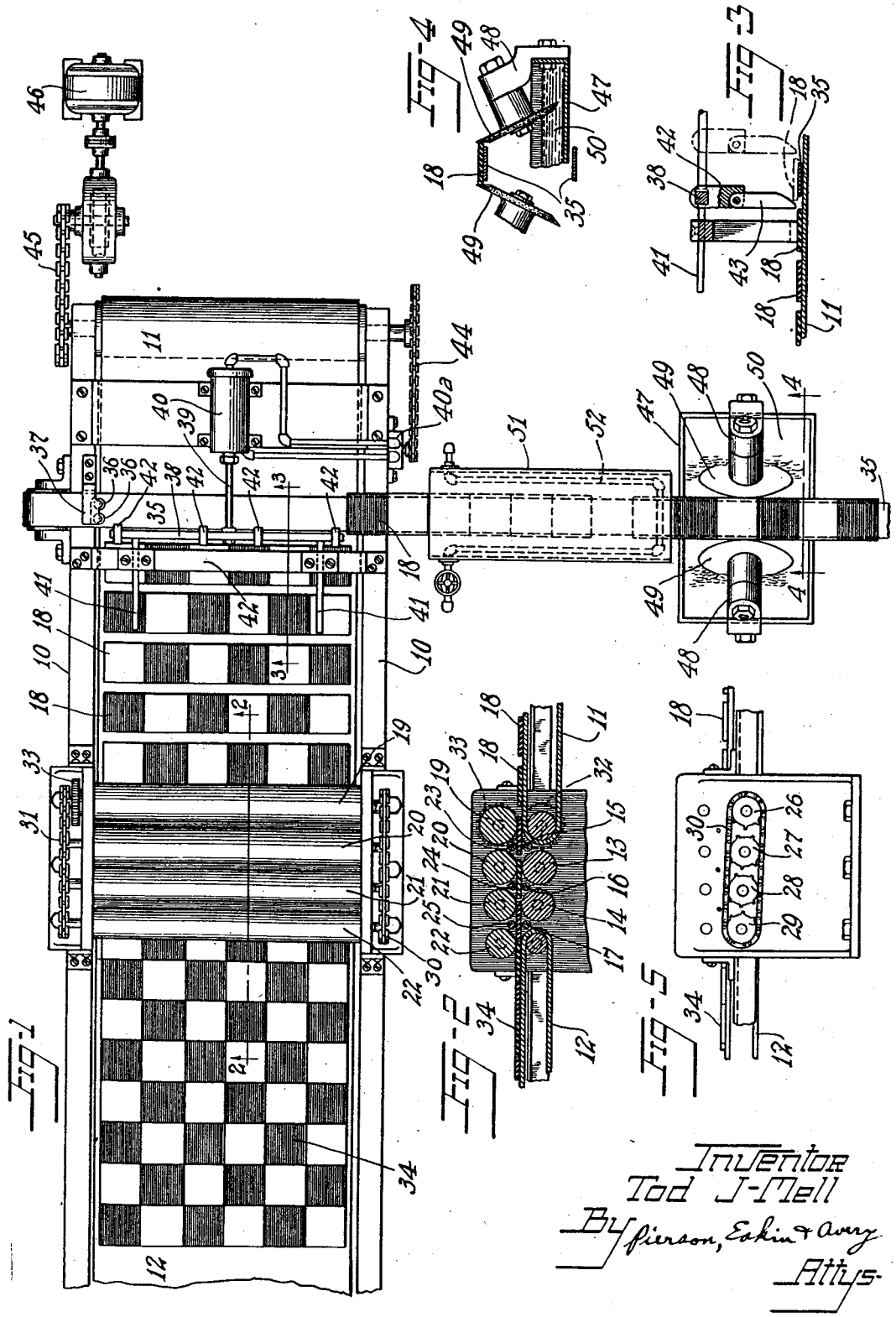
Inventor
Tod J. Mell
By Pierson, Eakin & Avery
Attys.

Patented Nov. 5, 1929

1,734,336

UNITED STATES PATENT OFFICE

TOD J. MELL, OF AKRON, OHIO, ASSIGNOR TO THE B. F. GOODRICH COMPANY, OF NEW YORK, N. Y., A CORPORATION OF NEW YORK

METHOD AND APPARATUS FOR ASSEMBLING UNITS OF SHEET MATERIAL

Application filed December 29, 1927. Serial No. 243,365.

This invention relates to methods and apparatus for assembling units of sheet material and especially strips or slabs of rubber adapted to be joined edge-to-edge to produce a patterned sheet of floor-covering material or the like, the slabs and the resulting sheet permissibly being of such thickness as to provide a sheet adapted to be sliced into a plurality of thinner sheets, for economy of manufacture and for other advantages, as set out in my United States Patent No. 1,588,797, granted June 15, 1926.

In the preparation of a stock sheet of checker-board or block-pattern design, for example, slabs of rubber of different colors are joined edge-to-edge to form a striped sheet, which is then cut crosswise of the original strips to produce strips each presenting a single row of block-pattern elements, and a plurality of these strips are then joined edge-to-edge with the block elements of each strip mismatched with those of the adjacent strips, to produce a checker-board design. This procedure involves the edge-to-edge joining of strips in each of the operations just described.

The chief objects of my invention are to provide improved procedure and apparatus for assembling and joining the strips whereby economy of labor may be effected; to provide accuracy in the assembling of the strips; and to provide apparatus adapted automatically to cement the edge faces of the strips prior to their assembly and thus to provide suitable adhesion of the assembled strips without the necessity of hammering the seams, which heretofore commonly has been resorted to.

Of the accompanying drawings:

Fig. 1 is a plan view of apparatus embodying and adapted to carry out my invention in its preferred form.

Fig. 2 is a section on line 2—2 of Fig. 1.

Fig. 3 is a section on line 3—3 of Fig. 1.

Fig. 4 is a section on line 4—4 of Fig. 1.

Fig. 5 is a side elevation of a portion of the apparatus showing the driving mechanism for a series of strip-assembling rolls.

Referring to the drawings, the machine comprises a pair of side frames 10, 10 for two longitudinally aligned endless belt-conveyors 11, 12, the receiving-end of the conveyor 12 being somewhat spaced apart from the delivery-end of the conveyor 11, as is shown clearly in Fig. 2. Between the two conveyors are two work-supporting and driving rolls 13, 14 and in alternation with the adjacent end rolls of the conveyors and the intervening rolls 13, 14 are small work-supporting idler rolls 15, 16, and 17, having their tops at the same level as the upper faces of the conveyors and the tops of the rolls 13, 14, these several rolls being adapted to support and feed forward in horizontal position a succession of rubber slabs or strips 18, 18.

Cooperating with this set of lower, work supporting and work-driving rolls is an upper set of work-driving and hold-down rolls including a roll 19 mounted just over the delivery-end roll of the conveyor 11, driven rolls 20 and 21 journaled just over the rolls 13 and 14 respectively, a driven roll 22 journaled just over the receiving-end roll of the conveyor 12, and a set of idler hold-down rolls 23, 24, and 25 mounted over and coacting with the small idler rolls 15, 16, and 17 of the lower set. For driving the several pairs of work-impelling rolls at equal angular speeds the shafts or trunnions of the rolls of the lower set have secured thereon respective sprockets 26, 27, 28, and 29 of equal diameters on which is mounted a sprocket chain 30 common to all of the sprockets and adapted to cause all of them to rotate in the same direction.

Likewise the work-impelling rolls of the upper set have drive connection with each other through a sprocket chain 31, and for driving the upper set of rolls intermeshed gears 32, 33 are secured upon the respective shafts or trunnions of the delivery-end roll of the conveyor 11 and the roll 19.

It will be observed that the virtual radius of each of the conveyor end-rolls is increased by the thickness of the conveyor belt. The work-driving elements of each of the two sets, upper and lower, are of successively smaller size from the receiving end to the delivery end of the series, so that each pair of work-driving elements has slower peripheral speed than the pair from which the work passes thereto. The successive pairs of work-driving elements are so spaced apart that each of the rubber slabs 18 is released by one before it is engaged by the next, so that no two pairs of the rolls are in engagement with the same slab at the same time, and each pair of rolls is adapted to feed the work more slowly than the pair from which the work passes to them. The construction as described is such that the conveyor 12 is driven at slower speed than that of the conveyor 11, and is such that a succession of the slabs 18 carried forward in spaced-apart relation to each other upon the conveyor 11, as shown, will be assembled in edge-to-edge abutted relation to each other, as they pass onto the conveyor 12, by the slowing up of the slabs as a result of the graduated speeds of the several pairs of rolls, the slabs thus being assembled in a continuous sheet 34 upon the conveyor 12. The slabs are caused to adhere to each other by the force with which the rolls impel each slab against the rear end of the more slowly-moving sheet 34 upon the slow-speed conveyor 12, the meeting edge faces of the slabs preferably being coated with rubber cement prior to their arrival at this part of the machine.

The surfaces of the rolls and of the conveyors are preferably smooth, so that discrepancy between the rate of arrival of the slabs 18 and the speed of the composite sheet 34 may be compensated by the slippage of the work-driving elements upon the work.

For mounting the slabs 18 in suitable spaced-apart relation upon the conveyor 11, I preferably provide a device comprising an endless belt conveyor 35 having timed driving connection (not shown) with the conveyor 11, the conveyor 35 being mounted at right angles to the conveyor 11 with its upper reach extending across the conveyor 11 just above the upper reach thereof. To stop each slab 18 at a suitable position upon the conveyor 35 to be shoved therefrom onto the conveyor 11 a pair of stop rollers 36, 36 are journaled on vertical axes just over the conveyor 35 upon a bracket 37 secured to the framing, the rollers 36 being adapted to serve as anti-friction members for the adjacent end face of the slab, which is held against them by continued movement of the conveyor 35, the conveyor slipping with relation to the slab, while the slab is shoved laterally from the conveyor 35.

For so shoving the slabs in succession from the conveyor 35 onto the conveyor 11 a yoke or bar 38 parallel with the conveyor 35 is secured at its middle to the end of the piston rod 39 of a fluid-pressure cylinder 40 which is suitably mounted upon the framing, and near each of its ends the yoke 38 is provided with a forwardly projecting guide bar 41 slidably mounted in an arch structure 42 spanning the conveyor 11. Secured upon the yoke or bar 38 are several blocks 42, 42 in each of which is pivoted a depending pawl 43 (Fig. 3) adapted to engage and drive the slab 18 in the forward movement of the yoke 38, the lower end of the pawl being just high enough to clear the conveyor 35, and the pawl being adapted to drag backward over the next slab 18 upon the conveyor 35 without interlocking with the slab, in the return movement of the yoke.

The cylinder 40 is provided with a suitable control valve 40ª having timed drive connection through a sprocket chain 44 with the drive roll of the conveyor 11, which latter has drive connection through a sprocket chain 45 with a motor 46.

For applying a coating of cement to each longitudinal edge of each slab 18 as the latter moves toward the conveyor 11 upon the conveyor 35, a cement tank 47 is mounted under the upper reach of the conveyor 35, and journaled on respective brackets 48, 48 secured to the container are a pair of cement discs 49, 49 having their peripheral edges so beveled and their axis so disposed that the said edges of the two discs at the upper parts of their respective orbits will engage the side edges of the rubber slab 18 as shown clearly in Fig. 4 and each will contact the adjacent edge face of the slab throughout the height of the said edge face, and the discs are so positioned that at the lower parts of their respective orbits they run in a body of cement 50 contained in the tank 47, the construction as described being such as to provide suitable cement-applying and driving contact of the discs with the vertical edge faces of the slab while permitting the lower part of each disc to run in the cement.

A dryer, comprising a shell 51 and a steam coil 52 therein is so mounted between the cement tank 47 and the conveyor 11 that the upper reach of the conveyor 35 extends through the dryer, to convey the slabs 18 therethrough, and thus to cause the solvent to be evaporated from the cement with which the edges of the slab are coated, in preparation for the joining of the slabs into the continuous sheet 34 as above described.

In the operation of the apparatus the slabs in succession are mounted in suitable spaced-apart relation upon the conveyor 35 at a part of the conveyor such that the slabs are carried by the conveyor past the cement discs 49, through the shell 51 of the dryer and to a position over the conveyor 11 where each slab is stopped by contact of its leading end with the stop rollers 36. The pusher comprising the yoke 38, being reciprocated in timed relation to the arrival of the successive slabs against the stop rollers 36, shoves the slabs in succession off the conveyor 35 onto the conveyor 11, the spacing of the slabs upon the conveyor 35 and the timing of the pusher being such as to cause the slabs to lie in uniformly spaced-apart transverse positions upon the conveyor 11. In the case of a checker-board design such as that here shown, the slabs are formed with an even number of design elements in each and alternate slabs are laid upon the conveyor 35 in reverse position as to the series of pattern elements in the slab, so that the said elements of adjacent slabs will be mismatched, to give the checker-board design, in the sheet 34.

The slabs received upon the conveyor 11 move forward in procession thereon and at the delivery-end of the conveyor the speed of each slab is gradually reduced as it passes through the series of work-driving elements at the adjacent ends of the two conveyors, so that each slab is brought into contact with the one next ahead of it, either before or at about the time that it reaches the conveyor 12, and preferably just before the leading edge of the added slab passes the bight between the roll 22 and the conveyor 12, so that those two elements will coact to effect a strong pressure of the slabs against each other and an accurate registry of the slabs with each other. The speed differential of the work-driving elements results in each slab being firmly pressed in place as a part of the continuous sheet 34, slippage of the sheet 34 upon the conveyor 12 and between that conveyor and the roll 22 compensating any discrepancies in the matter of dimensions and initial spacing of the slabs.

Thus the operation of the apparatus is almost completely automatic and the invention provides the several advantages set out in the above statement of objects.

Various modifications are possible within the scope of my invention as defined in the appended claims.

I claim:

1. The method of assembling strips of rubber to form a rubber sheet which comprises feeding the strips concurrently and at the same speed in spaced apart relation in procession and at an assembling position so decreasing the speed of the strips in succession as to cause each strip to contact with the one next following it.

2. The method of assembling strips of rubber to form a rubber sheet which comprises feeding a plurality of the strips concurrently and at the same speed in procession and from the procession feeding them into a sheet structure.

3. The method of assembling strips of rubber to form a rubber sheet which comprises feeding a plurality of the strips concurrently and at the same speed in procession and from the procession feeding them into a sheet structure, the sheet structure being fed forward as it is enlarged by addition of strips so that the successive strips are added to the sheet at approximately the same assembling position.

4. The method of assembling strips of rubber to form a rubber sheet which comprises feeding a plurality of the strips longitudinally in procession to a determinate position and from that position feeding them laterally into a sheet structure.

5. The method of assembling strips of rubber to form a rubber sheet which comprises feeding a plurality of the strips longitudinally in procession to a determinate position, coating a side edge of each strip with an adhesive as it is so fed, and from the said position feeding the strips laterally in succession into a sheet structure.

6. The method of assembling strips of rubber to form a rubber sheet which comprises coating an attachment face of each strip with an adhesive and by rolling pressure feeding the strips in succession into a sheet structure, pressing the attachment face of each strip against the next strip in the sheet structure, and forcing it into registry therewith in edge-to-edge abutted relation.

7. The method of assembling strips of rubber to form a rubber sheet which comprises feeding the strips in succession by rolling pressure into a sheet structure and by rolling pressure effecting edge-to-edge alignment and consolidation of the strips.

8. Strip-assembling apparatus comprising means for feeding a series of strips, laterally of their length and in procession, and means for so reducing the speed of the strips at an assembling position as to cause each strip to contact with the one next following it.

9. Strip-assembling apparatus comprising means for supporting a sheet structure formed of strips joined in edge-to-edge relation and means for feeding strips in succession into such relation in the sheet structure.

10. Strip-assembling apparatus comprising means for feeding a sheet structure formed of strips joined in edge-to-edge relation and means for adding strips to said sheet structure in such relation while the sheet structure is so fed.

11. Strip-assembling apparatus comprising means for longitudinally feeding the strips in procession to a determinate position and means for feeding them laterally from the said position into a sheet structure.

12. Strip-assembling apparatus comprising means for longitudinally feeding the strips in procession to a determinate position, means for coating an attachment surface of each strip with an adhesive as it passes to the said position, and means for feeding the strips laterally from the said position in succession into a sheet structure with the coated surface of each strip abutting an adjacent strip in the sheet structure.

13. Strip-assembling apparatus comprising a pair of rotary members adapted to pass the strips through their bight, means for feeding the strips to the said members, and means for so controlling the relative speeds of the said means and the said members as to cause a strip fed by the said means to the said members to overtake and abut a strip embraced by the said members.

14. Strip-assembling apparatus comprising a pair of strip embracing members adapted to embrace and resist rapid movement of one of the strips between them and means for so presenting a second strip to a strip so embraced and pressing it against the same as to urge the embraced strip forward between the two said members.

15. Strip-assembling apparatus comprising a conveyor, a second conveyor mounted with its conveying surface transverse to and under that of the first conveyor, means for stopping successive strips on the first conveyor in a determinate position over the second conveyor, and means timed with the speed of the second conveyor for removing the strips in succession from the said position and causing them to lie in spaced apart relation upon the second conveyor.

16. Apparatus as defined in claim 15 in which the strip-removing means comprises a reciprocating pawl device.

17. Strip-assembling apparatus as defined in claim 15 including means for applying an adhesive to the strips while they are on the first conveyor.

18. Strip-assembling apparatus comprising a conveyor adapted to support and convey a strip disposed longitudinally thereon with the side margins of the strip overhanging the conveyor, a cement tank, a pair of cementing discs so mounted as to run at the lower parts of their orbits in a body of cement in the said tank and at the upper parts of their orbits to embrace a strip on the said conveyor, and means associated with the said conveyor for receiving a succession of the strips therefrom and feeding them transversely of their length into a continuous sheet.

19. Strip-assembling apparatus as defined in claim 18 in which the discs are so beveled at their peripheries and so mounted on inclined axes that their beveled faces are adjacent, vertical and spaced apart at the tops of their orbits.

20. Strip-assembling apparatus comprising two aligned and spaced apart conveyors, at least one pair of work-embracing rolls mounted between the said conveyors and adapted to feed strips from one of the same to the other, and means for driving the delivering conveyor, the said rolls and the receiving conveyor at determinate relative speeds decreasing from one to the next throughout the series of elements.

In witness whereof I have hereunto set my hand this 23rd day of December, 1927.

TOD J. MELL.